(12) United States Patent
Bolbolan et al.

(10) Patent No.: US 11,566,678 B2
(45) Date of Patent: Jan. 31, 2023

(54) DISK SPRING FOR A VARIABLE TURBINE GEOMETRY OF AN EXHAUST GAS TURBOCHARGER

(71) Applicant: BMTS Technology GmbH & Co. KG, Stuttgart (DE)

(72) Inventors: Daren Bolbolan, Hochdorf (DE); Kinh T. Pham, Hagen (DE)

(73) Assignee: BMTS TECHNOLOGY GMBH & CO. KG

( * ) Notice: Subject to any disclaimer, the term of this patent is extended or adjusted under 35 U.S.C. 154(b) by 534 days.

(21) Appl. No.: 16/446,606

(22) Filed: Jun. 19, 2019

(65) Prior Publication Data

US 2019/0390728 A1 Dec. 26, 2019

(30) Foreign Application Priority Data

Jun. 20, 2018 (DE) ...................... 10 2018 210 024.1

(51) Int. Cl.
*F01D 17/12* (2006.01)
*F16F 1/32* (2006.01)
*F01D 25/24* (2006.01)

(52) U.S. Cl.
CPC .............. *F16F 1/328* (2013.01); *F01D 17/12* (2013.01); *F01D 25/246* (2013.01); *F05D 2220/40* (2013.01); *F05D 2260/30* (2013.01); *F16F 2230/48* (2013.01)

(58) Field of Classification Search
CPC ...... F01D 17/12; F01D 17/143; F01D 17/165; F02C 12/06; F16F 1/328; F05D 2260/38; F05D 2240/40
See application file for complete search history.

(56) References Cited

U.S. PATENT DOCUMENTS 5,087,176 A * 2/1992 Wieland ................. F01D 5/025
415/177
2009/0053044 A1 2/2009 Ward
(Continued)

FOREIGN PATENT DOCUMENTS

| DE | 10 2008 032 808 A1 | 1/2010 |
| DE | 10 2014 213 616 A1 | 1/2016 |
| DE | 102015225828 A1 | 7/2016 |

(Continued)

OTHER PUBLICATIONS

English abstract for DE-10 2008 032 808.
(Continued)

*Primary Examiner* — David E Sosnowski
*Assistant Examiner* — Maxime M Adjagbe
(74) *Attorney, Agent, or Firm* — Fishman Stewart PLLC

(57) ABSTRACT

A disk spring may include an annular base body, a central longitudinal axis of which defines an axial direction of the base body. A profile of the base body in a profile plane containing the central longitudinal axis may have a wave-shaped contour with two minima including a radially inner minimum and a radially outer minimum and with an intermediate maximum disposed between the two minima. The wave-shaped contour may extend from a radially inner end point to a radially outer end point. The radially inner end point may be arranged offset in the axial direction with respect to the radially outer end point.

18 Claims, 1 Drawing Sheet

(56) References Cited

U.S. PATENT DOCUMENTS

2011/0014036 A1* 1/2011 Boening ............... F16F 1/324
                                                        415/177
2016/0195006 A1   7/2016 Morgan

FOREIGN PATENT DOCUMENTS

| DE | 10 2015 217 668 A1 | 3/2017 |
| EP | 0 187 486 A1 | 7/1986 |
| GB | 465 236 A | 5/1937 |
| JP | 2005042588 A | 2/2005 |
| SU | 1483127 A2 | 5/1989 |
| WO | WO-2009/092678 A1 | 7/2009 |
| WO | WO-2011/018503 A1 | 2/2011 |

OTHER PUBLICATIONS

English abstract for DE-10 2014 213 616.
English abstract for SU-1483127.
English abstract for DE-10 2015 217 668.
Chinese Office Action dated Oct. 19, 2021 for copending Chinese App. No. 201910475476.3 (w_English_translation).
Chinese Search Report dated Oct. 9, 2021 for copending Chinese App. No. 201910475476.3.

* cited by examiner

DISK SPRING FOR A VARIABLE TURBINE GEOMETRY OF AN EXHAUST GAS TURBOCHARGER

CROSS-REFERENCE TO RELATED APPLICATIONS

This application claims priority to German Patent Application No. DE 10 2018 210 024.1, filed on Jun. 20, 2018, the contents of which are hereby incorporated by reference in its entirety.

TECHNICAL FIELD

The invention relates to a disk spring, in particular for a variable turbine geometry of an exhaust gas turbocharger.

BACKGROUND

Disk springs in variable turbine geometries of exhaust gas turbochargers typically fulfil two functions: on the one hand, they serve as a heat shield in order to shield waste heat generated during operation in the exhaust gas turbocharger with respect to the kinematics of the variable turbine geometry. Furthermore, specific components of the variable turbine geometry can be pre-tensioned by means of the disk spring.

Such conventional disk springs are known, for example, from DE 10 2008 032 808 A1 and from WO 2009/092678 A1.

A disadvantage with such conventional disk springs is that as a result of the typically very high operating temperatures of up to 850° C. in the exhaust gas turbocharger, the disk springs relax, therefore can undergo plastic deformation, especially as they usually have a very high tension level in the installed state. In addition, typically only a little installation space is available in the exhaust gas turbocharger which causes a short spring deflection and a high stiffness for the disk spring.

SUMMARY

It is the object of the present invention to indicate new paths in the development of disk springs, in particular for variable turbine geometries of exhaust gas turbochargers. In particular, a disk spring is to be provided in which the aforesaid disadvantage no longer appears or only in a substantially reduced form.

This object is solved by the subject matter of the independent claim(s). Preferred embodiments are the subject matter of the dependent claim(s).

The basic idea of the invention is accordingly to make the contour of the disk spring wave-shaped with two minima and one intermediate maximum so that the contour is provided with large radii of curvature. In this way, the elastically deformable region of the disk spring is enlarged compared with conventional disk springs. Undesired operation-induced relaxation effects in the disk spring can be minimized in this way or even completely prevented without this being accompanied by a reduction in the stiffness or an increase in the spring deflection.

A disk spring according to the invention, in particular for a variable turbine geometry of an exhaust gas turbocharger, comprises an annular base body, the central longitudinal axis of which defines an axial direction of the base body. The profile of the base body in a profile plane containing the central longitudinal axis has a wave-shaped contour with one radially inner and one radially outer minimum and with one intermediate maximum arranged between the two minima. The contour in this case extends from a radially inner end point to a radially outer end point in relation to the radial direction running perpendicular to the axial direction. The radially inner end point is arranged offset in the axial direction with respect to the radially outer end point.

According to a preferred embodiment, the base body has a first and a second turning point in the profile which are both arranged in a common plane which extends perpendicularly to the axial direction. The geometry associated with this embodiment allows the implementation of particularly large radii of curvature with the result that the formation of relaxation zones in which the disk spring is plastically deformed can be counteracted.

Preferably the two turning points and therefore the common plane are arranged at the height of the radially outer end point in relation to the axial direction. This variant makes it possible to maximize the elastically deformable region.

According to an advantageous further development, the profile comprises a radially inner profile section which is delimited radially inwards by the radially inner end point and a radially outer profile section which is delimited radially outwards by the radially outer end point. In this further development, the radially outer profile section and the radially inner profile section are arranged at a distance to one another. The contour of the radially outer profile section is in this case a mirroring of the radially inner profile section on a mirror axis arranged between the two profile sections and running parallel to the central longitudinal axis of the base body. In this case, the contour of the radially outer profile section is arranged offset to the contour of the radially inner profile section in the axial direction. This variant also makes it possible to enlarge the elastically deformable region.

Particularly preferably the radially inner and the radially outer profile section are arranged offset with respect to one another by the same amount along the axial direction as the radially inner and the radially outer end point. This measure is also accompanied by an increase in the elastically deformable region of the disk spring.

Expediently the radially inner profile section is delimited radially outwards by the second turning point.

Particularly preferably the radially inner minimum is arranged in the radially inner profile section and the radially outer minimum is arranged in the radially outer profile section. In particular, the radially inner minimum can delimit the radially inner profile section radially outwards. This measure is also accompanied by particularly large radii of curvature in the wave-shaped contour.

According to an advantageous further development, the radially inner profile section goes over into the radially outer profile section by means of a transition profile section in which the intermediate maximum provided between the minima is arranged. A disk spring configured in such a manner can be produced by simple forming processes using a sheet metal layer as starting material.

Expediently, the two profile sections, i.e. the radially inner and the radially outer profile section, each go over continuously and kink-free into the transition profile section. A disk spring configured in such a manner has a particularly high spring constant and accompanying this, a particularly high stiffness.

According to an advantageous further development, the radially inner profile section adjoins the transition profile section at the second turning point. Alternatively or additionally in this further development, the radially outer profile section adjoins the transition profile section at a third turning point.

According to an advantageous further development, the third turning point in relation to the axial direction is arranged offset with respect to the common plane in which the first and second turning point are arranged.

Particularly preferably the profile is configured to be continuous, in particular without forming a step, and/or kink-free. A disk spring configured in such a manner has a particularly high spring constant.

The invention further relates to a variable turbine geometry for an exhaust gas turbocharger. The variable turbine geometry according to the invention comprises a bearing housing, on which a previously described disk spring is arranged. The previously explained advantages of the disk spring are thus also transferred to the variable turbine geometry according to the invention.

The invention further relates to an exhaust gas turbocharger comprising a turbine, comprising a compressor and comprising a previously mentioned variable turbine geometry. The previously explained advantages of the disk spring are thus also applied to the exhaust gas turbocharger according to the invention.

Further important features and advantages of the invention are obtained from the subclaims, from the drawings and from the relevant description of the figures with reference to the drawings.

It is understood that the features mentioned previously and to be explained further hereinafter can be used not only in the respectively given combination but also in other combinations or alone without departing from the scope of the present invention.

Preferred exemplary embodiments of the invention are shown in the drawings and will be explained in detail in the following description, wherein the same reference numbers relate to the same or similar or functionally the same components.

BRIEF DESCRIPTION OF THE DRAWINGS

In the figures, in each case schematically.

DETAILED DESCRIPTION

Figure 1:
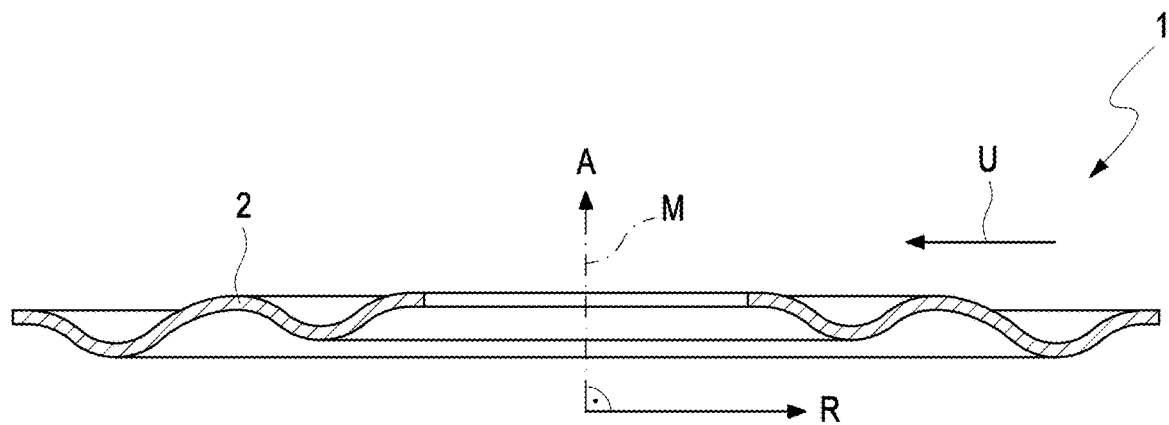
FIG. 1 shows an example of a disk spring according to the invention in a lateral sectional view.

FIG. 1 shows an example of a disk spring 1 according to the invention in a lateral sectional view. The disk spring 1 comprises an annular base body 2 which can be formed by a sheet metal moulding. An axial direction A of the base body 2 is defined by a central longitudinal axis M of the base body 2. The base body 2 extends along a circumferential direction U which runs perpendicular to the central longitudinal axis M and therefore also to the axial direction A and borders a through-opening. A radial direction R extends perpendicular to the central longitudinal axis M and thus also extends perpendicularly to the axial direction A and perpendicularly to the circumferential direction U.

Figure 2:
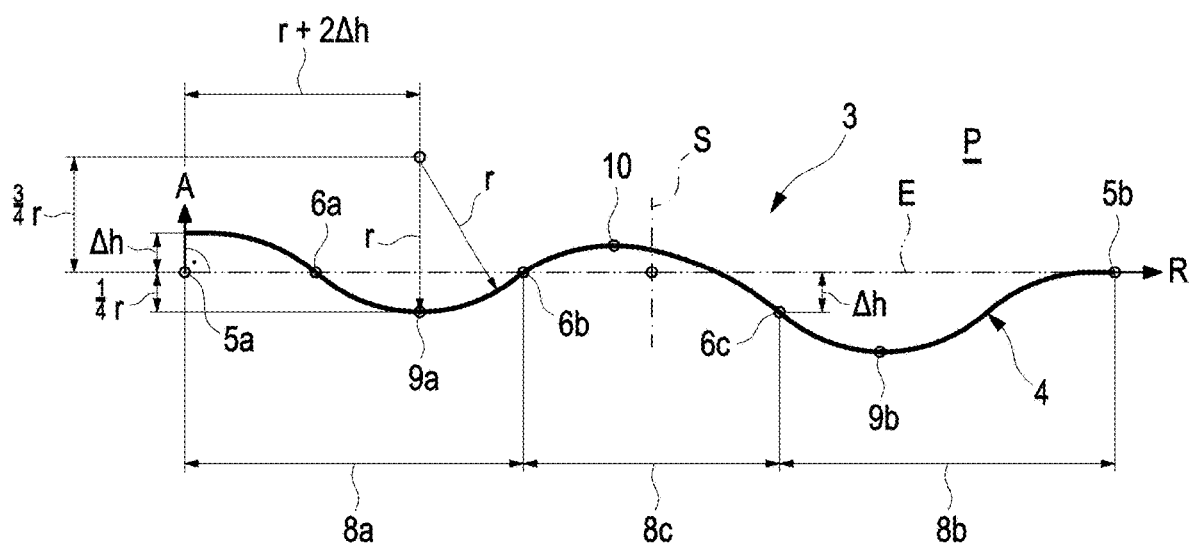
FIG. 2 shows the disk spring of FIG. 1 in profile.

FIG. 2 shows a profile 3 of the base body 2 in a profile plane P which contains the central longitudinal axis M. Accordingly, the profile 3 has a wave-shaped contour 4 which extends from a radially inner end point 5a to a radially outer end point 5b. In this case, the radially inner end point 5a is arranged offset along the axial direction A with respect to the radially outer end point 5b. The profile 3 of the base body 2 as shown in FIG. 2 is preferably continuous, in particular without forming a step, and also kink-free.

According to FIG. 1, the base body 2 has a first and a second turning point 6a, 6b in the profile 3, which are both arranged in a common plane E which in turn extends perpendicular to the axial direction A. The common plane E intersects the profile plane P orthogonally. In relation to the axial direction A, the two turning points 6a, 6b and therefore also the common plane E are arranged at the height of the radially outer end point 5b.

According to FIG. 2, the profile 3 of the base body 2 has a radially inner profile section 8a which is delimited radially inwards by the inner end point 5a and a radially outer profile section 8b which is delimited radially outwards by the outer end point 5b. The radially inner profile section 8a goes over into the radially outer profile section 8b by means of a transition profile section 8c, i.e. the radially inner profile section 8a and the radially outer profile section 8b are arranged at a distance from one another along the radial direction R. The radially inner profile section 8a and the radially outer profile section 8b in this case go over continuously and kink-free into the transition profile section 8c. The contour 4 of the radially outer profile section 8b is a mirroring of the radially inner profile section 8a on a mirror axis S running between the two profile sections parallel to the central longitudinal axis M of the base body 2.

As clearly confirmed in FIG. 2, the contour 4 of the radially outer profile section 8b is offset in the axial direction A with respect to the contour 4 of the radially inner profile section 8a. In this case, the radially inner and the radially outer profile section 8a, 8b are arranged offset with respect to one another along the axial direction by the same amount Δh as the inner and the outer end point 5a, 5b. The radially inner profile section 8a adjoins the transition profile section 8c at the second turning point 6b. The radially outer profile section 8b adjoins the transition profile section 8c at a third turning point 6c which is different at the first and second turning point 6a, 6b. The third turning point 6c delimits the radially outer profile section 8b inwards. The radially inner profile section 8a is delimited radially outwards by the second turning point 6b.

As can be seen in FIG. 2, the third turning point 6c is arranged in relation to the axial direction A offset with respect to the common plane E in which the first and second turning points 6a, 6b are arranged.

As can also be seen in FIG. 2, the profile of the base body 2 has a radially inner and a radially outer minimum 9a, 9b as an intermediate maximum 10 arranged between these two minima 9a, 9b. The radially inner minimum 9a is arranged in the radially inner profile section 8a and the radially outer minimum 10b is arranged in the radially outer profile section 8b. The intermediate maximum 10 is arranged in the transition profile section 8c.

In the example of FIG. 2 the contour 4 has a predetermined radius of curvature r between the two turning points 6a, 6b. A distance y of the radially inner minimum 9a to the plane E measured along the axial direction A is a quarter of the radius of curvature r, i.e. y=0.25 r. A distance x between the radially inner end point 5a and the radially inner minimum 9a measured along the radial direction R obeys the relationship: x=r+2*Δh.

The invention claimed is:
1. A disk spring, comprising:
an annular base body;
a central longitudinal axis which defines an axial direction of the base body;

wherein a profile of the base body in a profile plane containing the central longitudinal axis has a wave-shaped contour with two minima including a radially inner minimum and a radially outer minimum and with an intermediate maximum disposed between the two minima, the wave-shaped contour extending from a radially inner end point to a radially outer end point, the radially inner end point arranged offset in the axial direction with respect to the radially outer end point;

wherein the profile extends between the radially inner end point and the radially outer end point;

wherein the profile has a radially inner profile section delimited radially inwards by the radially inner end point and a radially outer profile section delimited radially outwards by the radially outer end point and disposed spaced apart from the radially inner profile section;

wherein a contour of the radially outer profile section is a mirroring of a contour of the radially inner profile section relative to a mirror axis extending between the radially outer profile section and the radially inner profile section parallel to the central longitudinal axis of the base body; and wherein the contour of the radially outer profile section is disposed offset to the contour of the radially inner profile section in the axial direction.

2. The disk spring according to claim 1, wherein the base body has a first turning point and a second turning point in the profile which are arranged in a common plane extending perpendicularly to the axial direction.

3. The disk spring according to claim 2, wherein the first turning point, the second turning point, and the common plane are arranged at a height of the radially outer end point in relation to the axial direction.

4. The disk spring according to claim 1, wherein the radially inner profile section and the radially outer profile section are arranged offset with respect to one another by a same amount along the axial direction as the radially inner end point and the radially outer end point.

5. The disk spring according to claim 1, wherein:
the base body has a first turning point and a second turning point in the profile which are arranged in a common plane extending perpendicularly to the axial direction; and
the radially inner profile section is delimited radially outwards by the second turning point.

6. The disk spring according to claim 1, wherein the radially inner minimum is arranged in the radially inner profile section and the radially outer minimum is arranged in the radially outer profile section.

7. The disk spring according to claim 1, wherein the profile has a transition profile section extending between the radially inner profile section and the radially outer profile section in which the intermediate maximum is arranged.

8. The disk spring according to claim 7, wherein the radially inner profile section and the radially outer profile section each extend continuously and kink-free into the transition profile section.

9. The disk spring according to claim 7, wherein the base body has a first turning point, a second turning point, and a third turning point in the profile, the second turning point disposed radially between the first turning point and the third turning point, the first turning point and the second turning point arranged in a common plane extending perpendicularly to the axial direction, and wherein at least one of:
the radially inner profile section adjoins the transition profile section at the second turning point; and
the radially outer profile section adjoins the transition profile section at the third turning point.

10. The disk spring according to claim 1, wherein the third turning point in relation to the axial direction is arranged offset with respect to the common plane in which the first turning point and second turning point are arranged.

11. The disk spring according to claim 1, wherein the profile is structured to be at least one of continuous and kink-free.

12. The disk spring according to claim 1, wherein the base body has a first turning point, a second turning point, and a third turning point in the profile, the second turning point disposed radially between the first turning point and the third turning point, the first turning point and the second turning point arranged in a common plane extending perpendicularly to the axial direction.

13. The disk spring according to claim 12, wherein the profile has:
a radially inner profile section extending between the inner radially end point and the second turning point, the radially inner minimum disposed in the radially inner profile section;
a transition profile section extending between the second turning point and the third turning point, the intermediate maximum disposed in the transition profile; and
a radially outer profile section extending between the third turning point and the radially outer end point, the radially outer minimum disposed in the radially outer profile section.

14. The disk spring according to claim 12, wherein the wave-shaped contour defines a constant radius of curvature between the first turning point and the second turning point.

15. The disk spring according to claim 14, wherein a distance between the radially inner minimum and the common plane relative to the axial direction is approximately ¼ of the radius of curvature.

16. The disk spring according to claim 14, wherein a radial distance between the radially inner end point and the radially inner minimum is equal to the radius of A curvature plus two times an axial distance between the radially inner end point and the radially outer end point.

17. A variable turbine geometry for an exhaust gas turbocharger, comprising a bearing housing and a disk spring arranged on the bearing housing, the disk spring including an annular base body, a central longitudinal axis of which defines an axial direction of the base body;

wherein a profile of the base body in a profile plane containing the central longitudinal axis has a wave-shaped contour with two minima including a radially inner minimum and a radially outer minimum and with an intermediate maximum disposed between the two minima, the wave-shaped contour extending from a radially inner end point to a radially outer end point, the radially inner end point arranged offset in the axial direction with respect to the radially outer end point;

wherein the profile has a radially inner profile section delimited radially inwards by the radially inner end point and a radially outer profile section delimited radially outwards by the radially outer end point and disposed spaced apart from the radially inner profile section;

wherein a contour of the radially outer profile section is a mirroring of a contour of the radially inner profile section relative to a mirror axis extending between the radially outer profile section and the radially inner profile section parallel to the central longitudinal axis of the base body; and wherein the contour of the radially outer profile section is disposed offset to the contour of the radially inner profile section in the axial direction.

18. An exhaust gas turbocharger for an internal combustion engine of a motor vehicle, comprising a compressor, a turbine, and a variable turbine geometry, the variable turbine geometry including a bearing housing and a disk spring arranged on the bearing housing, the disk spring including an annular base body, a central longitudinal axis of which defines an axial direction of the base body;

wherein a profile of the base body in a profile plane containing the central longitudinal axis has a wave-shaped contour with two minima including a radially inner minimum and a radially outer minimum and with an intermediate maximum disposed between the two minima, the wave-shaped contour extending from a radially inner end point to a radially outer end point, the radially inner end point arranged offset in the axial direction with respect to the radially outer end point;

wherein the profile has a radially inner profile section delimited radially inwards by the radially inner end point and a radially outer profile section delimited radially outwards by the radially outer end point and disposed spaced apart from the radially inner profile section;

wherein a contour of the radially outer profile section is a mirroring of a contour of the radially inner profile section relative to a mirror axis extending between the radially outer profile section and the radially inner profile section parallel to the central longitudinal axis of the base body; and wherein the contour of the radially outer profile section is disposed offset to the contour of the radially inner profile section in the axial direction.

* * * * *